(12) United States Patent
Schwager et al.

(10) Patent No.: US 11,507,154 B2
(45) Date of Patent: Nov. 22, 2022

(54) THERMAL VENTING IN KEYBOARD OF A PORTABLE INFORMATION HANDLING SYSTEM

(71) Applicant: Dell Products L.P., Round Rock, TX (US)

(72) Inventors: Mark Andrew Schwager, Cedar Park, TX (US); Travis C. North, Cedar Park, TX (US); Yu-Feng Huang, Hsin-Chu (TW); Kai-Yuan Cheng, Taipei (TW)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/079,832

(22) Filed: Oct. 26, 2020

(65) Prior Publication Data

US 2022/0129052 A1   Apr. 28, 2022

(51) Int. Cl.
*G06F 1/20* (2006.01)
*G06F 1/16* (2006.01)

(52) U.S. Cl.
CPC ............ *G06F 1/203* (2013.01); *G06F 1/1662* (2013.01)

(58) Field of Classification Search
CPC .......... G06F 1/1616; G06F 1/203; G06F 1/20; G06F 2200/201; G06F 2200/202; G06F 1/1662; H05K 7/20; H05K 7/20136; H05K 7/20145; H05K 7/202
See application file for complete search history.

(56) References Cited

U.S. PATENT DOCUMENTS

| | | | | |
|---|---|---|---|---|
| 6,322,229 B1* | 11/2001 | Chan | ................... | H01H 13/702 362/85 |
| 6,542,355 B1* | 4/2003 | Huang | .................. | G06F 3/0202 312/223.2 |
| 6,646,226 B1* | 11/2003 | Reitz | ..................... | G06F 3/0202 219/209 |
| 7,327,559 B2* | 2/2008 | Fox | ....................... | G06F 1/1616 219/209 |
| 8,866,030 B2* | 10/2014 | Liang | .................... | G06F 1/1662 200/5 A |
| 2005/0023265 A1* | 2/2005 | Lyle | ...................... | G06F 1/1662 219/209 |
| 2005/0266872 A1* | 12/2005 | MacIntosh | ............. | H04M 1/03 455/550.1 |
| 2009/0174994 A1* | 7/2009 | Merz | .................... | G06F 3/0202 361/679.09 |
| 2009/0327755 A1* | 12/2009 | Ikeda | .................... | G06F 21/78 713/189 |

(Continued)

*Primary Examiner* — Michael A Matey
(74) *Attorney, Agent, or Firm* — Terrile, Cannatti & Chambers; Stephen A. Terrile

(57) ABSTRACT

A keyboard assembly for a portable information handing system. The keyboard assembly includes a plurality of keys, the plurality of keys being arranged in a typewriter style layout to allow a user to enter text content into the portable information handling system; and, a keyboard carrier, the plurality of keys being mounted to the keyboard carrier, the keyboard carrier determining when a key of the plurality of keys is actuated and generating information regarding the key of the plurality of keys, the keyboard carrier comprising a venting portion, the venting portion being located beneath a set of keys of the plurality of keys, the venting portion comprising a plurality of venting apertures.

14 Claims, 8 Drawing Sheets

(56) References Cited

U.S. PATENT DOCUMENTS

| | | | |
|---|---|---|---|
| 2011/0198205 A1* | 8/2011 | Chang | H01H 3/125 |
| | | | 200/302.1 |
| 2012/0033427 A1* | 2/2012 | Chen | G06F 3/0202 |
| | | | 362/253 |
| 2013/0022382 A1* | 1/2013 | Raff | G06F 1/1662 |
| | | | 400/472 |
| 2020/0328050 A1* | 10/2020 | Files | G06F 3/0219 |
| 2021/0098212 A1* | 4/2021 | Wang | H01H 13/86 |

* cited by examiner

THERMAL VENTING IN KEYBOARD OF A PORTABLE INFORMATION HANDLING SYSTEM

BACKGROUND OF THE INVENTION

Field of the Invention

The present invention relates to information handling systems. More specifically, embodiments of the invention relate to a keyboard assembly for a portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a keyboard assembly for a portable information handing system, comprising: a plurality of keys, the plurality of keys being arranged in a typewriter style layout to allow a user to enter text content into the portable information handling system; and, a keyboard carrier, the plurality of keys being mounted to the keyboard carrier, the keyboard carrier determining when a key of the plurality of keys is actuated and generating information regarding the key of the plurality of keys, the keyboard carrier comprising a venting portion, the venting portion being located beneath a set of keys of the plurality of keys, the venting portion comprising a plurality of venting apertures.

In another embodiment the invention relates to an information handling system comprising: a processor; a data bus coupled to the processor; and an information handling system chassis housing, the housing comprising a base chassis, the base chassis housing the processor, the base chassis comprising a keyboard assembly, the keyboard assembly comprising a plurality of keys, the plurality of keys being arranged in a typewriter style layout to allow a user to enter text content into the portable information handling system; and, a keyboard carrier, the plurality of keys being mounted to the keyboard carrier, the keyboard carrier determining when a key of the plurality of keys is actuated and generating information regarding the key of the plurality of keys, the keyboard carrier comprising a venting portion, the venting portion being located beneath a set of keys of the plurality of keys, the venting portion comprising a plurality of venting apertures.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
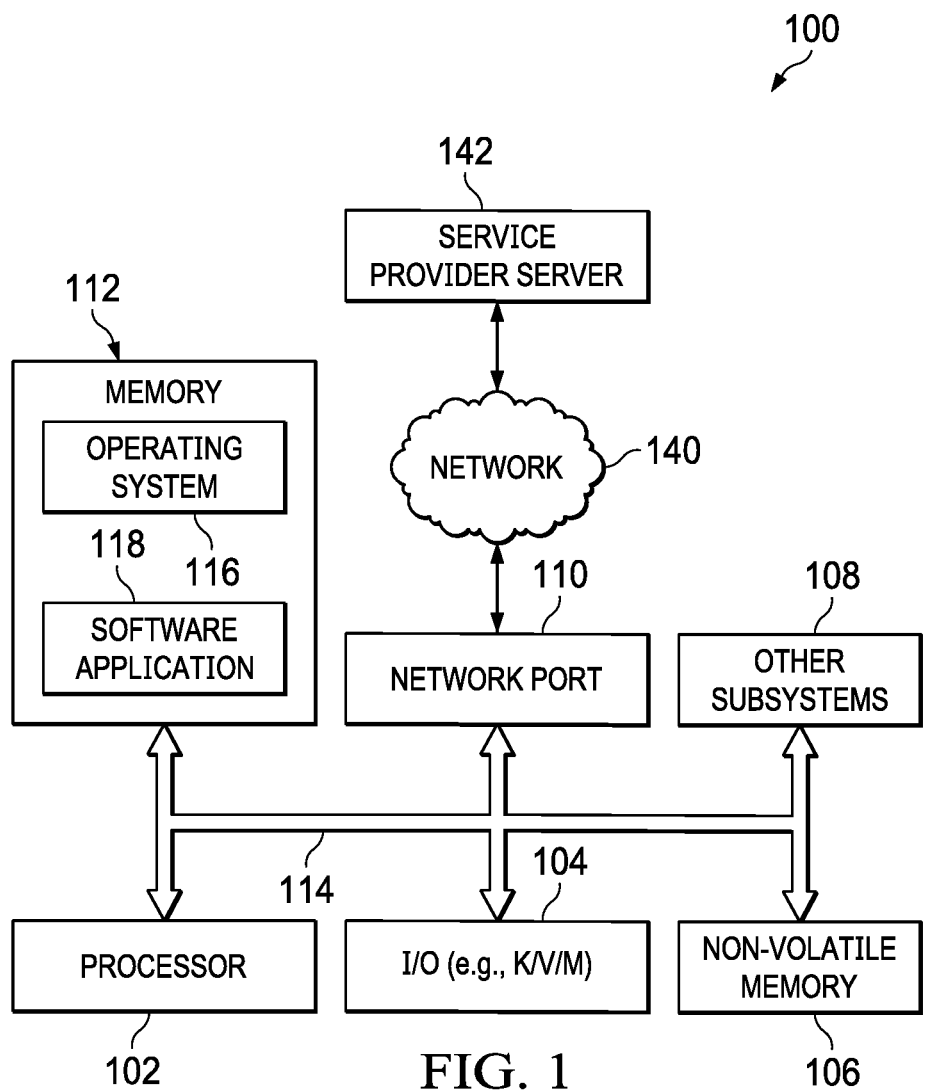
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

Figure 2:
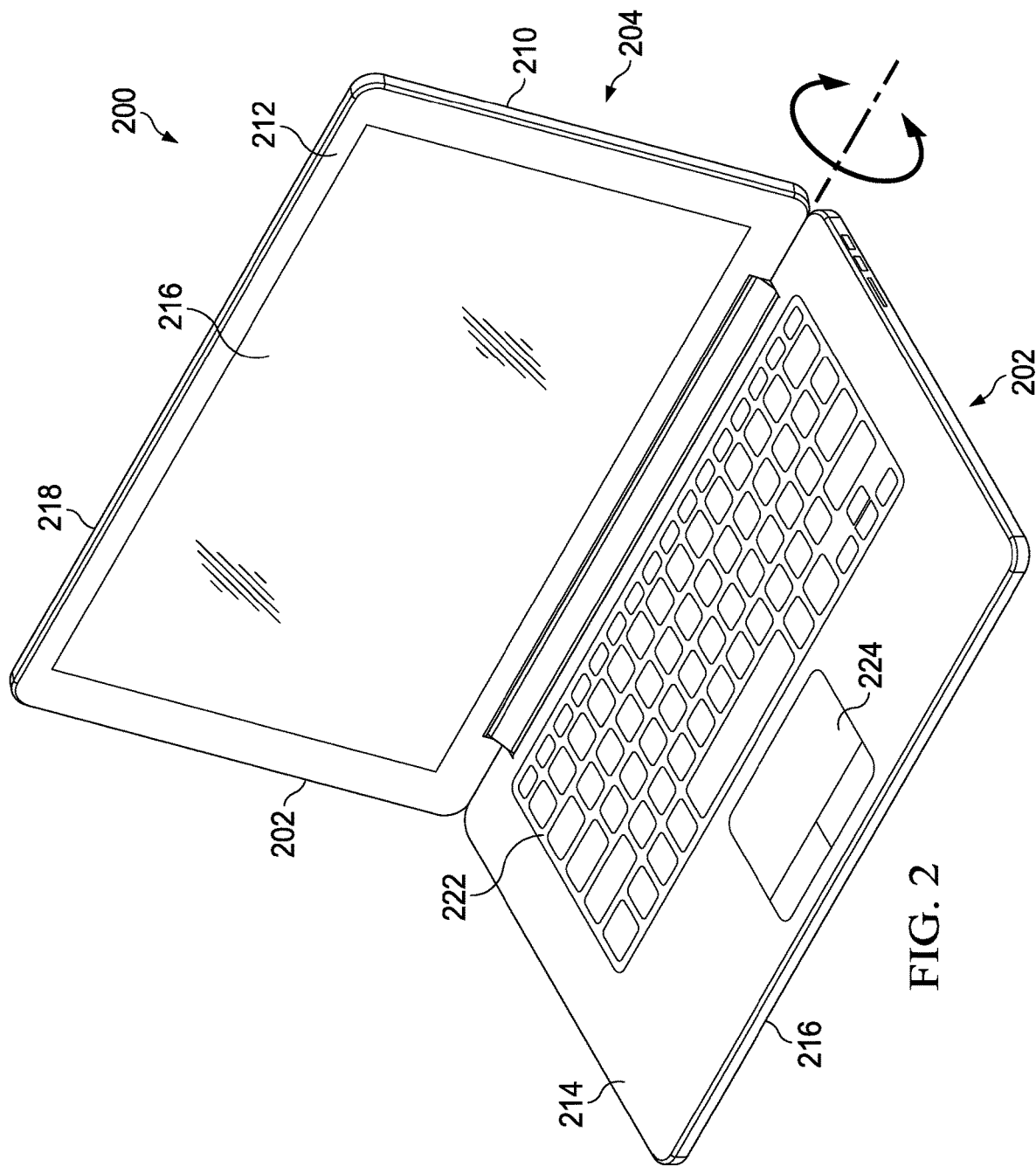
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 216 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 202 forms a top outer protective shell, or a portion of a lid, for the information handling system 200, while the D-cover 204 forms a bottom outer protective shell, or a portion of a base, for the information handling system. When in the fully closed configuration, the A-cover 202 and the D-cover 204 would be substantially parallel to one another.

In some embodiments, both the A-cover 202 and the D-cover 204 may be comprised entirely of metal. In some embodiments, the A-cover 202 and D-cover 204 may include both metallic and plastic components. For example, plastic components that are radio-frequency (RF) transparent may be used to form a portion of the C-cover 208.

In various embodiments, the A-cover 202 may be movably connected to a back edge of the D-cover 204 via one or more hinges. In this configuration, the hinges allow the A-cover 202 to rotate from and to the D-cover 204 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the A-cover 204 with regard to the D-cover 204, for example up to 180° rotation arc. In other embodiments the information handling system 200 may be a convertible information handling system with full rotation to a tablet configuration.

Figure 3:
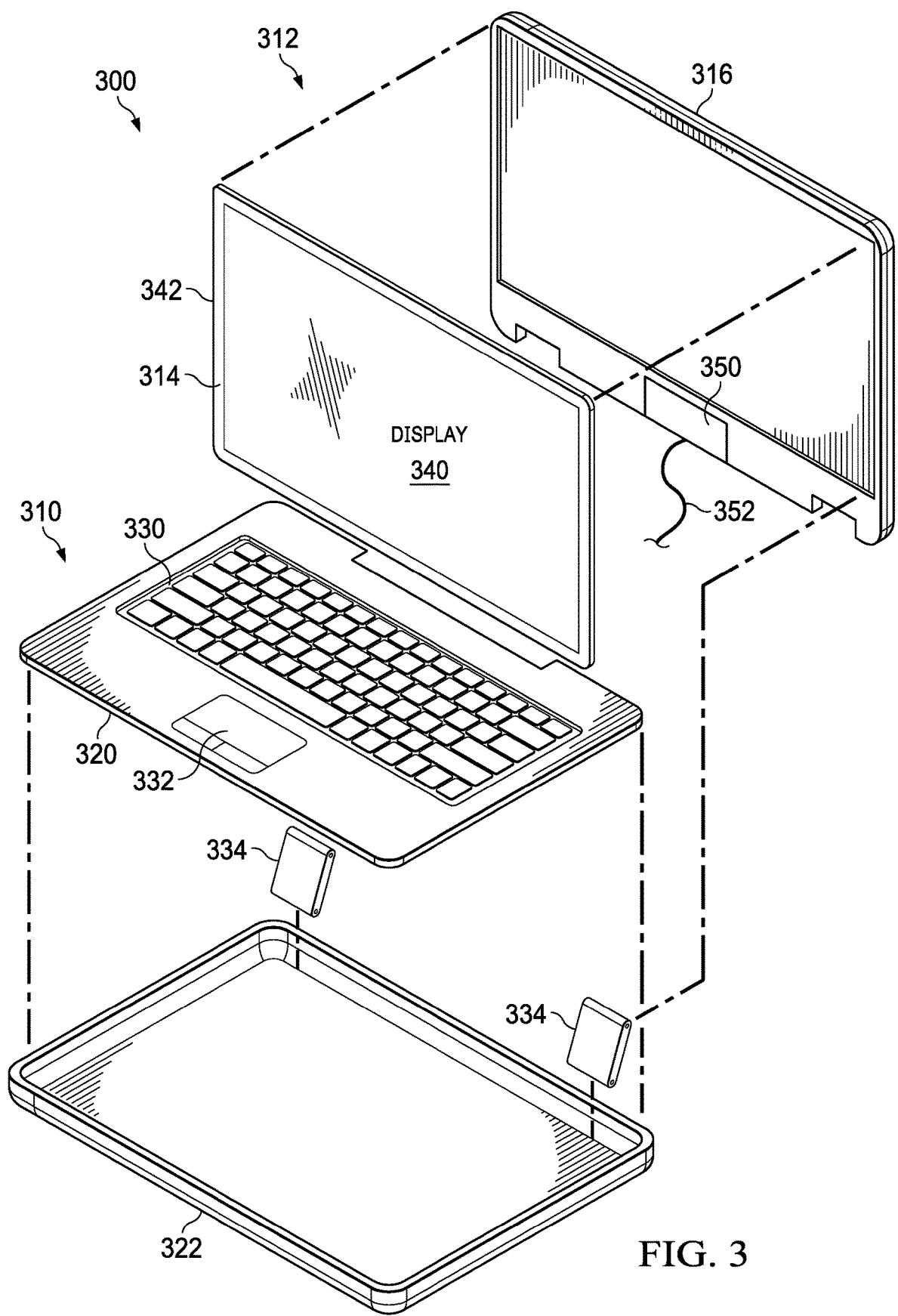
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 210) and a rear display cover portion 316 (which includes the A-Cover 212). The top cover portion 320 may include an integrated keyboard 330 or other I/O devices, such as a trackpad 332 or microphone (not shown). In various embodiments, the keyboard 330 may be mounted to the top of the C-Cover of the main housing portion 310. In various embodiments, the keyboard 330 may be mounted to the underside of the C-Cover of the main housing portion 310.

Lid housing portion 312 is rotationally coupled to main housing portion 310 via at least one hinge assembly 334. Lid housing portion 212 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 212 such that bezel may be narrow in size (e.g., less than 10 millimeters) on the edges. For example, display 340 is an infinity display with narrow bezels on the top and sides of lid housing portion 212 in the embodiment shown in FIG. 3. In certain embodiments, the side bezel is less than 4 mm (+/−10%) and the top bezel is less than 6 mm (+/−10%).

Lid housing portion 212 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 212 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4:
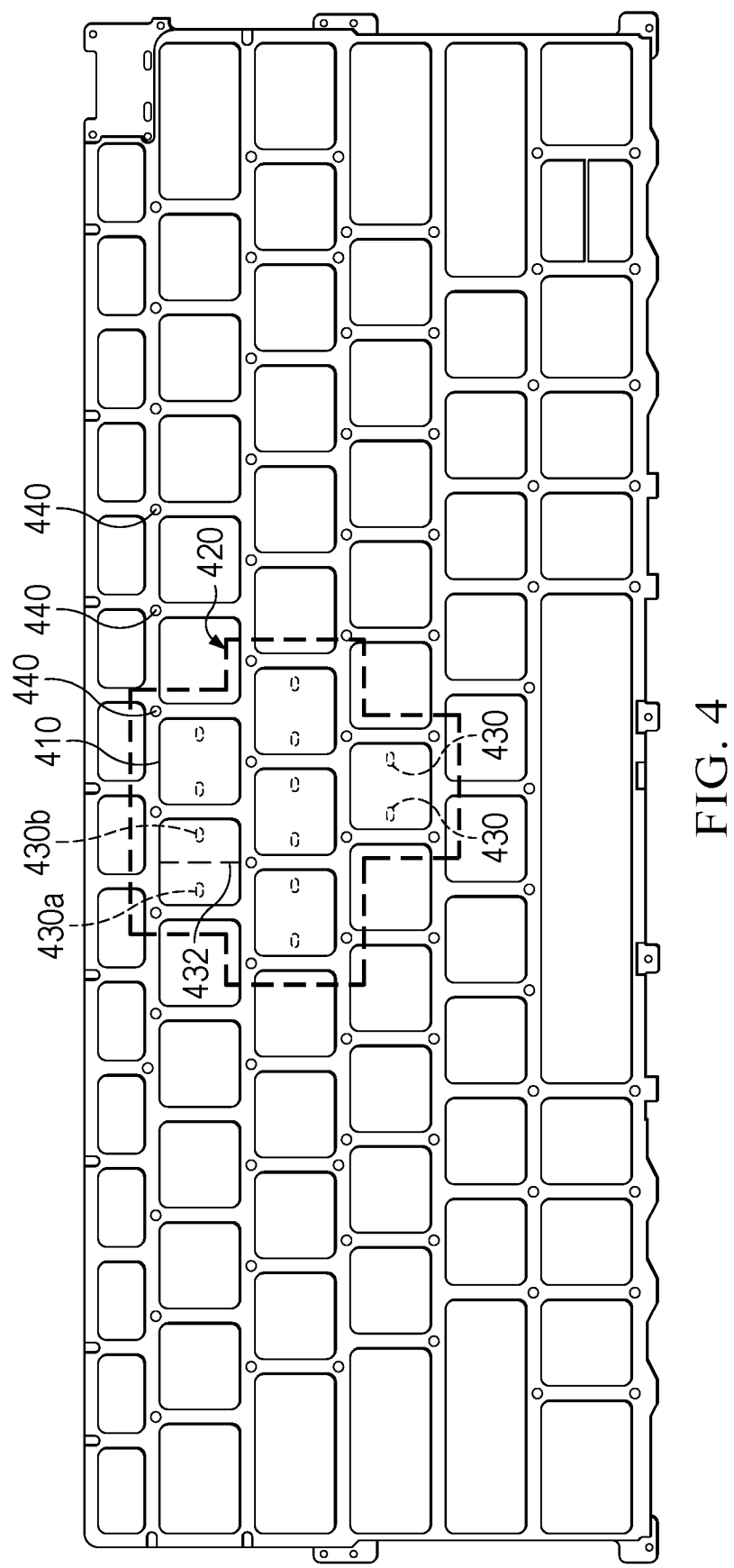
FIG. 4 shows a top view of a vented keyboard assembly of a portable information handling system.

FIG. 4 shows a top view of a vented keyboard assembly 400 of a portable information handling system. In various embodiments, the vented keyboard assembly 700 is for use with a portable information handling system having a screen size of greater than 13 inches or for any system with a smaller keyboard pitch. The vented keyboard assembly 400 includes a plurality of keys 410 as well as a venting portion 420. In various embodiments, such as when the keyboard assembly is an undermount keyboard assembly the keyboard assembly 400 includes a plurality of mounting portions 440.

In various embodiments, the venting portion 420 includes a plurality of venting apertures 430 located underneath certain keys 410 of the keyboard assembly 400. In certain embodiments, each certain key 410 includes two apertures 430a, 430b positioned equidistantly from a hypothetical vertical center 432 of the certain key. In certain embodiments, the two apertures are positioned so at to not interfere with the functionality of the key under which the apertures are positioned.

In certain embodiments, the venting portion 420 is positioned over a centrally located portion of the main housing portion of a portable information handling system. In certain embodiments, the venting portion 420 is positioned over a portion of the portable information handing system having the highest heat generating components. In certain embodiments, the venting portion is positioned over at least one of a processor of the portable information handling system and a graphics device of the portable information handling system.

Figure 5:
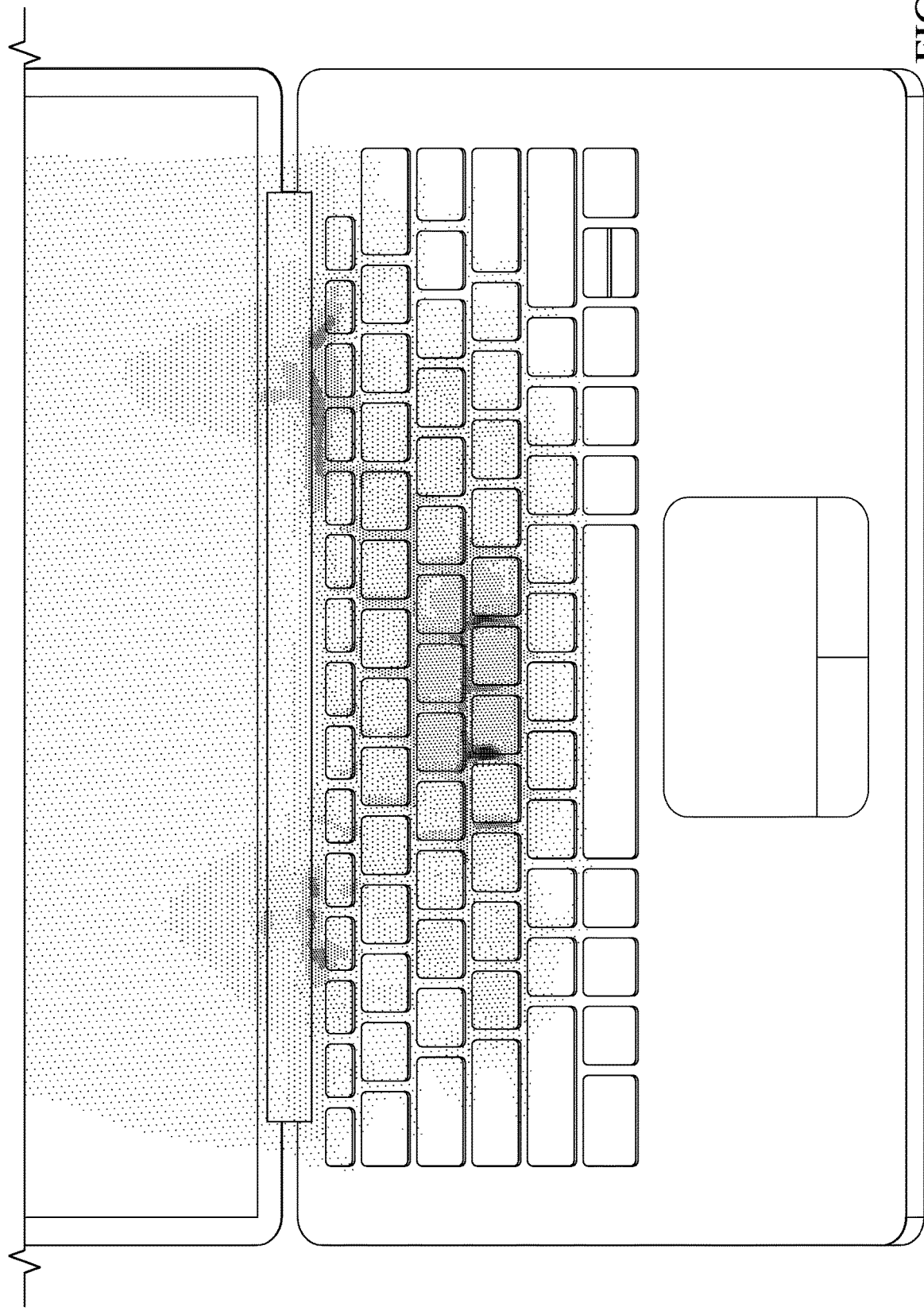
FIG. 5 shows an example heat distribution of a portable information handling system having a vented keyboard assembly.

FIG. 5 shows an example heat distribution of a portable information handling system having a vented keyboard assembly. More specifically, in the example heat distribution, internally generated heat of the portable information handling system is vented via the venting portion of the keyboard assembly.

Figure 6:
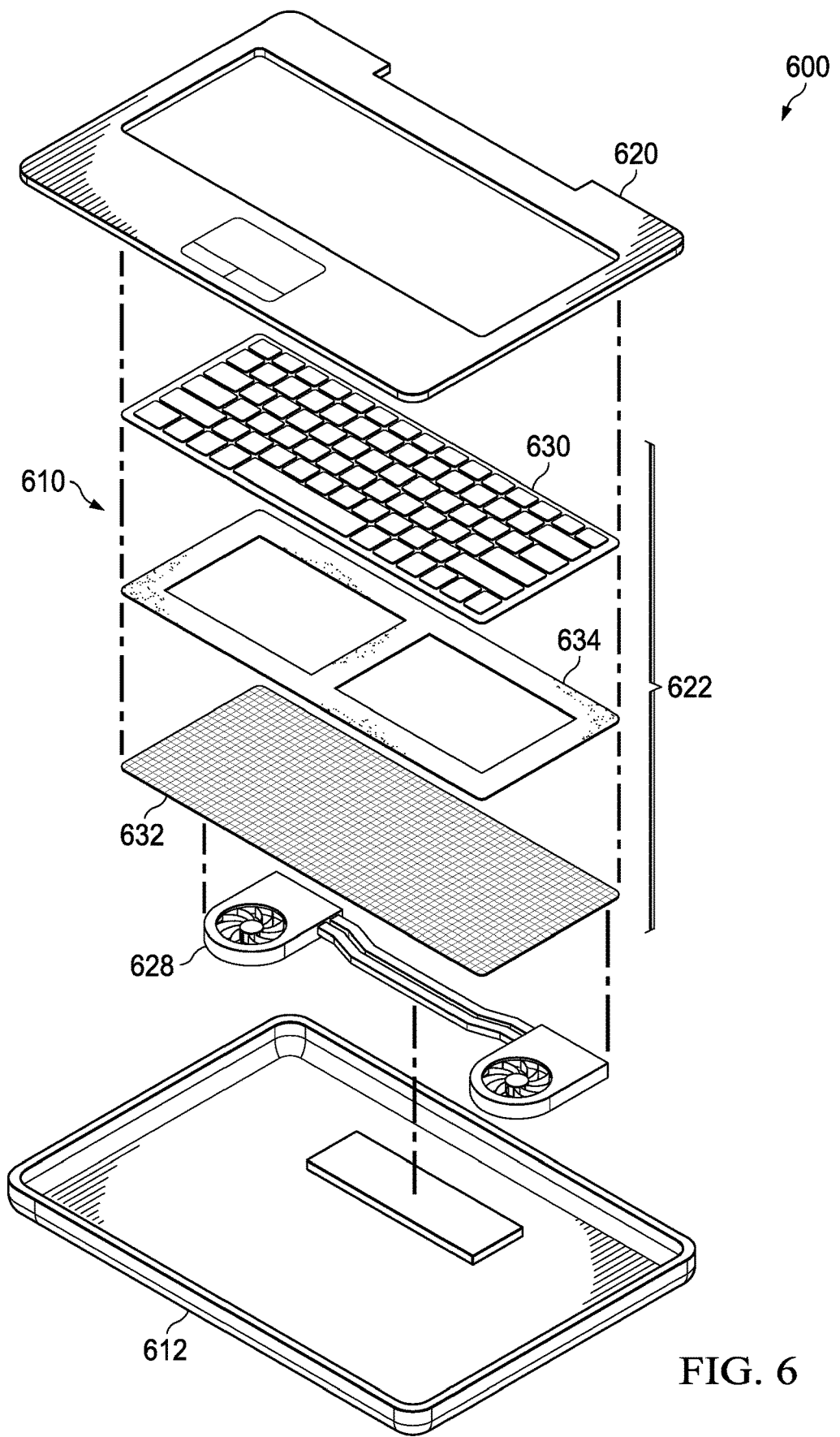
FIG. 6 shows an exploded view of a main housing portion of a portable information handling system.

FIG. 6 shows a diagrammatic exploded view of a main housing portion 600 of a portable information handling system. More specifically, the main housing portion 600 includes a top cover portion 610 and a bottom cover portion 612. In certain embodiments, the top cover portion 610 corresponds to cover portion 320. In certain embodiments, the bottom cover portion 612 corresponds to bottom cover portion 322.

In certain embodiments, the top cover portion 610 includes a main housing top cover 620 (e.g., a C-Cover) and a vented keyboard assembly 622. In certain embodiments, the bottom cover portion 322 includes one or more components of the portable information handling system. In certain embodiments, the bottom cover portion 322 includes a processor module. In certain embodiments, the processor module is mounted to the underside of a processor module carrier 626. In certain embodiments the bottom cover portion 322 includes a fan module 628.

In certain embodiments, when the main housing portion 600 is assembled, there is a small gap (e.g., 1-3 mm) between the processor module carrier 626 and the underside of the vented keyboard assembly 622. In certain embodiments, the small gap is defined by the gap from a palmrest of the portable information handling system to the motherboard of the portable information handling system. Various aspects of the disclosure include an appreciation that the smaller this gap is, the more stagnant the airflow and thus presents a need for more venting apertures. In certain embodiments, a venting portion of the vented keyboard assembly is positioned over the processor module carrier 626. In certain embodiments, the venting portion extends across a majority of the surface area of side of the processor module carrier positioned next to the keyboard assembly. In certain embodiments, the venting portion of the vented keyboard assembly is positioned to facilitate airflow across the processor module carrier 626 to the fan module 628.

In certain embodiments, the vented keyboard assembly 622 includes a keyboard component 630, a mesh component 632 and an adhesive component 634. In certain embodiments, the keyboard component 630 includes a keyboard carrier as well as a plurality of keys. In certain embodiments, the plurality of keys are arranged in a typewriter style layout to allow a user to enter content into the portable information handling system. In certain embodiments, the keyboard carrier includes a venting portion (e.g., venting portion 420) having a plurality of apertures. In certain embodiments, the plurality of apertures are positioned under certain keys of the keyboard assembly 622.

In certain embodiments, the mesh component 632 extends across the plurality of venting apertures of the venting portion of the keyboard component 630. In certain embodiments, the mesh component 632 is attached to the keyboard carrier via the adhesive component 634. The mesh component 632 provides spill resistance to prevent liquid from passing from the venting apertures to components of the portable information handling system. In certain embodiments, the mesh component 632 comprises a polyester non-woven material which provides a ventilation metric (cm3/cm2·s) of greater than 750. In certain embodiments, the mesh component 632 is an anti-dust prevention mesh. In certain embodiments, the mesh component 632 includes an anti-dust prevention mesh available under the trade designation 3M Anti-dust Prevention Mesh ADPM010 or the like. In certain embodiments, the adhesive component 634 includes apertures corresponding to sets of the plurality of apertures of the venting portion. In certain embodiments, the adhesive component comprises a polyester film (such as a film available under the trade designation Mylar) to which an adhesive is applied.

Various aspects of the present disclosure include an appreciation that including the mesh component with the vented keyboard assembly enables the portable information handling system to pass predetermined spill tests. In certain embodiments, the predetermined spill test spills a set amount of liquid (e.g., 2 oz) over the keyboard, pours the liquid out, and evaluates the functionality of the system after 24 hours. The unit must be fully functional to pass the spill test. In certain embodiments, different types of liquid (e.g., water and soda) may be spilled over the keyboard.

Figure 7:
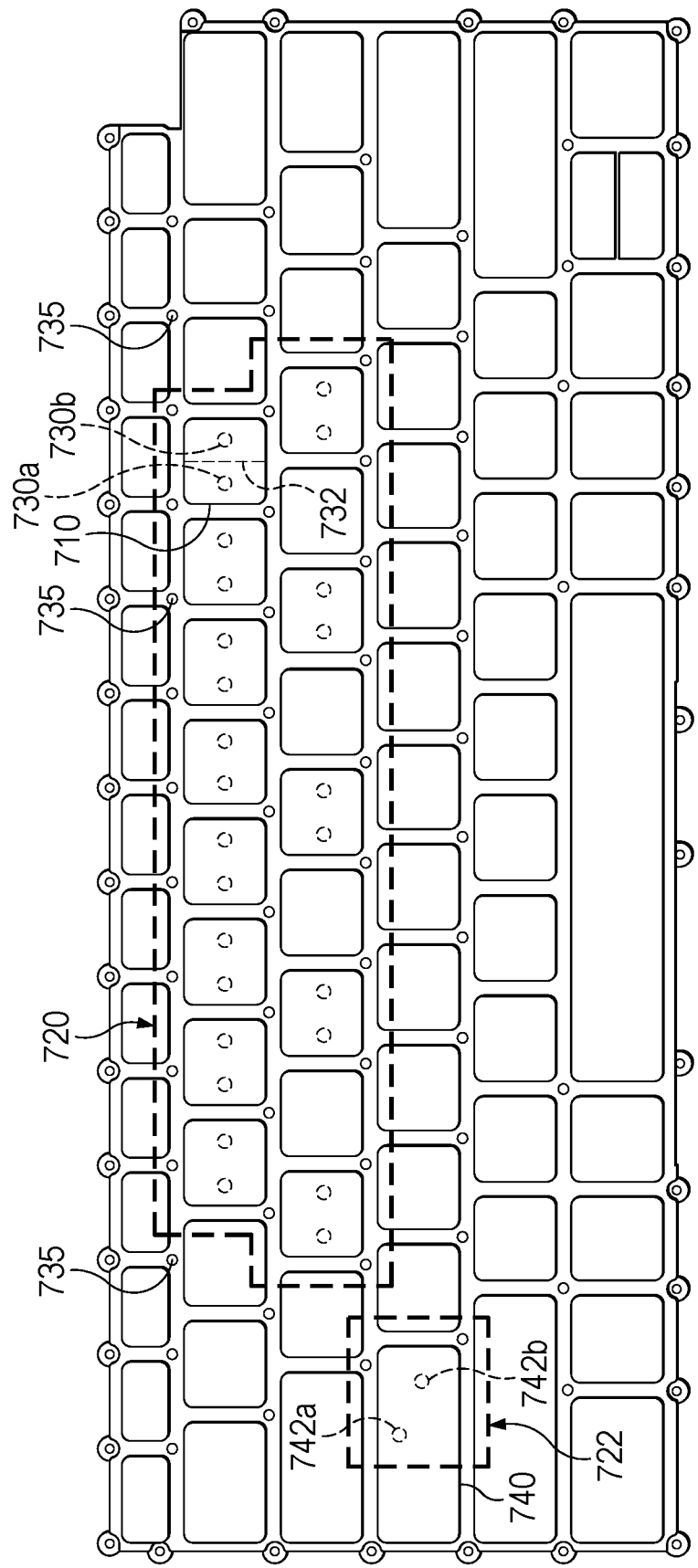
FIG. 7 shows a top view of another vented keyboard assembly of a portable information handling system.

FIG. 7 shows a top view of another vented keyboard assembly of a portable information handling system. In certain embodiments, the vented keyboard assembly 700 is for use with a portable information handling system having a screen size of greater than 13 inches or for systems having a larger keyboard pitch. The vented keyboard assembly 700 includes a plurality of keys 710 as well as a venting portion 720. In various embodiments, the vented keyboard assembly 700 includes a supplemental venting portion 722. In various embodiments, such as when the keyboard assembly is an undermount keyboard assembly the keyboard assembly 700 includes a plurality of mounting portions 735.

In various embodiments, the venting portion 720 includes a plurality of venting apertures 730 located underneath certain keys 710 of the keyboard assembly 700. In certain embodiments, a plurality of evenly distributed apertures under certain key 710 includes. Various aspects of the present disclosure include an appreciation that when a hotspot of the system is wider (such as when a system includes both a processor and a graphics processor located in close proximity with each other), the venting portion may be wider to take the wider hotspot into account. In certain embodiments, each certain key 710 includes two apertures 730a, 730b positioned equidistantly from a hypothetical vertical center 732 of the certain key. In certain embodiments, the two apertures are positioned so at to not interfere with the functionality of the key under which the apertures are positioned.

In certain embodiments, the venting portion 720 is positioned over a centrally located portion of the main housing portion of a portable information handling system. In certain embodiments, the venting portion 720 is positioned over a portion of the portable information handing system having the highest heat generating components. In certain embodiments, the venting portion is positioned over at least one of a processor of the portable information handling system and a graphics device of the portable information handling system.

In various embodiments, the supplemental venting portion 722 includes a plurality of venting apertures 730 located underneath a key 740 of the keyboard assembly 700. In certain embodiments, the key 740 includes two apertures 742a, 742b positioned equidistantly under the key. In certain embodiments, the two apertures are positioned so at to not interfere with the functionality of the key under which the apertures are positioned. In certain embodiments, the supplemental venting portion 722 is positioned over a fan of the system. In certain embodiments, positioning the supplemental venting portion over a fan of the system provides the fan with access to lower temperature, which further aids cooling of the portable information handling system.

Figure 8:
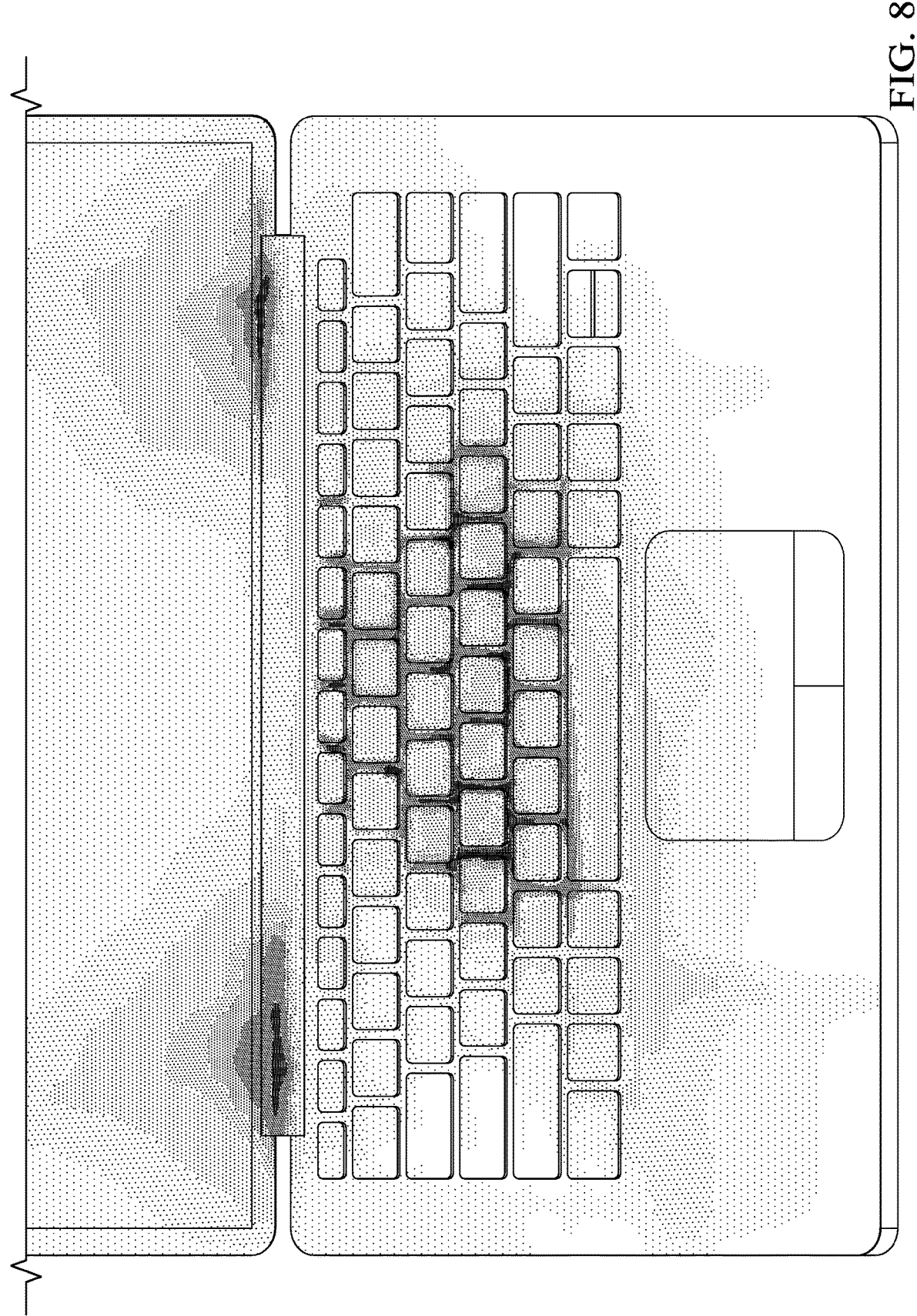
FIG. 8 shows an example heat distribution of a portable information handling system having another vented keyboard assembly.

FIG. 8 shows an example heat distribution of a portable information handling system having another vented keyboard assembly. More specifically, in the example heat distribution, internally generated heat of the portable information handling system is vented via the venting portion of the keyboard assembly.

Other embodiments are within the following claims. For example, venting apertures may be used to vent sound waves such as in a system where a speaker is located underneath the keyboard. Also for example, the keyboard assembly can include a backlight component attached to the keyboard. In systems which include a backlight component, the backlight component can also be configured with a corresponding venting portion having venting apertures corresponding to the venting apertures of the keyboard.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A keyboard assembly for a portable information handing system, comprising:
   a plurality of keys, the plurality of keys being arranged in a typewriter style layout to allow a user to enter text content into the portable information handling system; and,
   a keyboard carrier, the plurality of keys being mounted to the keyboard carrier, the keyboard carrier determining when a key of the plurality of keys is actuated and generating information regarding the key of the plurality of keys, the keyboard carrier comprising a venting portion, the venting portion being located beneath a set of keys of the plurality of keys, the venting portion comprising a plurality of venting apertures; and wherein
   the plurality of venting apertures are positioned beneath certain keys of the plurality of keys;
   the plurality of venting apertures positioned beneath certain keys are positioned equidistantly from a hypothetical vertical center of each key, the plurality of venting apertures being positioned equidistantly from the hypothetical vertical center of each key so as to not interfere with functionality of the key under which the apertures are positioned;
   each of the plurality of venting apertures extends from a bottom of the keyboard carrier to a top of the keyboard carrier;
   the venting portion is positioned over a component of the portable information handling system, the component having a surface area;
   an underside of the keyboard assembly and the component define a gap;
   the venting portion extends across a majority of the surface area of the component; and,
   the venting portion facilitates airflow across the component via the gap.

2. The keyboard assembly of claim 1, wherein:
   a mesh component is mounted to an underside of the keyboard carrier, the mesh component providing spill resistance to prevent liquid from passing from the plurality of venting apertures to components of the portable information handling system, the mesh component providing a ventilation function from a fan module to the plurality of venting apertures.

3. The keyboard assembly of claim 2, wherein:
the mesh component is mounted to a portion of the underside of the keyboard carrier corresponding to the venting portion.

4. The keyboard assembly of claim 2, wherein:
the mesh component is mounted to the underside of the keyboard carrier via an adhesive component; and,
the adhesive component defines apertures corresponding to subsets of the plurality of venting apertures.

5. The keyboard assembly of claim 1, wherein:
a set of certain keys correspond to the venting portion; and
the set of certain keys are positioned over a centrally located portion of the keyboard carrier.

6. The keyboard assembly of claim 5, wherein:
the plurality of venting apertures are positioned beneath each certain key.

7. The keyboard of claim 1, wherein:
the component comprises at least one of a processor, a graphics unit and a speaker.

8. An information handling system comprising:
a processor;
a data bus coupled to the processor; and
an information handling system chassis housing, the housing comprising
a base chassis, the base chassis housing the processor, the base chassis comprising a keyboard assembly, the keyboard assembly comprising
 a plurality of keys, the plurality of keys being arranged in a typewriter style layout to allow a user to enter text content into the portable information handling system; and,
 a keyboard carrier, the plurality of keys being mounted to the keyboard carrier, the keyboard carrier determining when a key of the plurality of keys is actuated and generating information regarding the key of the plurality of keys, the keyboard carrier comprising a venting portion, the venting portion being located beneath a set of keys of the plurality of keys, the venting portion comprising a plurality of venting apertures; and wherein
 the plurality of venting apertures are positioned beneath certain keys of the plurality of keys;
 the plurality of venting apertures positioned beneath certain keys are positioned equidistantly from a hypothetical vertical center of each key, the plurality of venting apertures being positioned equidistantly from the hypothetical vertical center of each key so as to not interfere with functionality of the key under which the apertures are positioned;
 each of the plurality of venting apertures extends from a bottom of the keyboard carrier to a top of the keyboard carrier;
 the venting portion is positioned over a component of the portable information handling system, the component having a surface area;
 an underside of the keyboard assembly and the component define a gap;
 the venting portion extends across a majority of the surface area of the component; and,
 the venting portion facilitates airflow across the component via the gap.

9. The information handling system of claim 8, further comprising:
a mesh component mounted to an underside of the keyboard carrier, the mesh component providing spill resistance to prevent liquid from passing from the plurality of venting apertures to components of the portable information handling system, the mesh component providing a ventilation function from a fan module to the plurality of venting apertures.

10. The information handling system of claim 9, wherein:
the mesh component is mounted to a portion of the underside of the keyboard carrier corresponding to the venting portion.

11. The information handling system of claim 9, wherein:
the mesh component is mounted to the underside of the keyboard carrier via an adhesive component; and,
the adhesive component defines apertures corresponding to subsets of the plurality of venting apertures.

12. The information handling system of claim 8, wherein:
a set of certain keys correspond to the venting portion; and,
the set of certain keys are positioned over a centrally located portion of the keyboard carrier.

13. The information handling system of claim 8, wherein:
the plurality of venting apertures are positioned beneath each certain key.

14. The information handling system of claim 8, wherein:
the component comprises at least one of the processor, a graphics unit and a speaker.

* * * * *